Aug. 3, 1926.
F. R. RITTER
BRAKE
Filed March 6, 1926
1,594,757
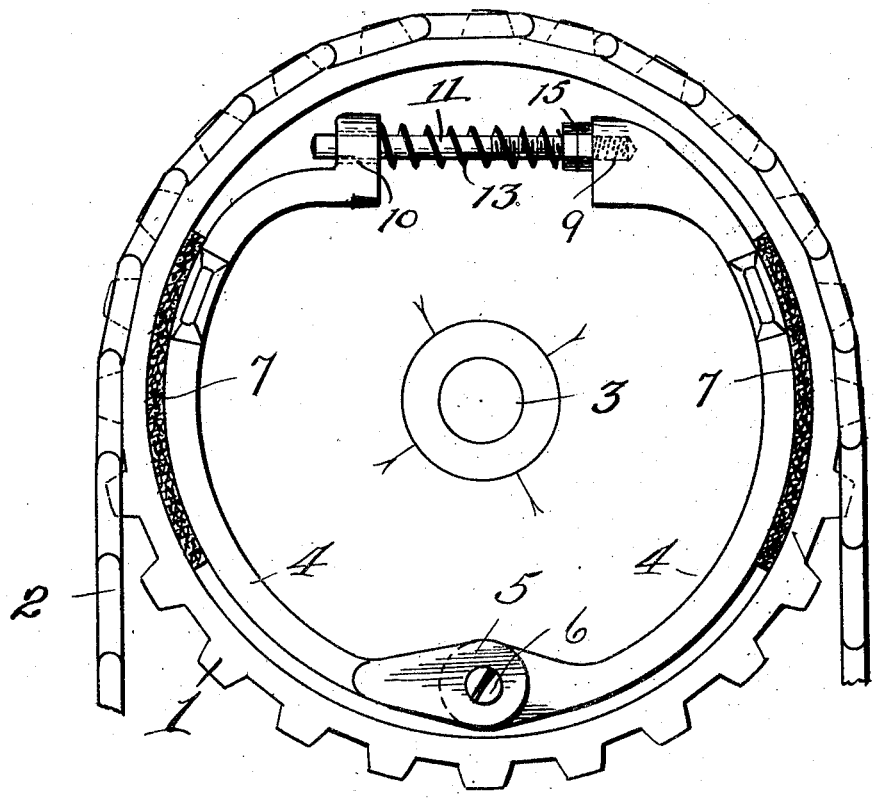
Frank R. Ritter,
Inventor
By
Attorney Patented Aug. 3, 1926.

1,594,757

UNITED STATES PATENT OFFICE.

FRANK R. RITTER, OF FLEETWOOD, PENNSYLVANIA.

BRAKE.

Application filed March 6, 1926. Serial No. 92,658.

This invention relates to improvements in brake devices and it is intended more particularly for use as a chain controlling device for use on knitting machines in which a pattern chain is employed.

The object of the present invention is to insure proper control at all times of the pattern chain, and to this end I have devised an expansible, spring actuated friction device to be applied to the interior of the sprocket wheel over which the chain passes.

The invention is more fully described in the following specification and clearly illustrated in the accompanying drawing, in which I have shown a front elevational view of a sprocket wheel with the pattern chain thereon, and having my improved controller mechanism applied thereto.

The numeral 1 designates a sprocket wheel and 2 a pattern chain, in engagement with said wheel. 3 designates a central shaft for the device and its accompanying mechanism.

The numeral 4 designates one of two like brake arms, which are pivotally joined to each other at their ends, 5, by means of any suitable device, as a screw 6.

Each brake arm is provided with a friction or bearing member 7, which latter bear against the inner face of the wheel when the arms are forced outwardly.

The free ends of these arms are provided, one with a tapped hole 9 and the other with a plain perforation 10 extending through it.

In these openings, I have located a threaded stem 11, the threaded end engaging the tapped opening in one of the arms 4, while the other end of the stem is free to slide into the perforation in the opposite arm. A spring 13 surrounds this stem, and is held under compression, so that its expansion will automatically apply the friction members 7 to the inner wall of the wheel 1.

The stem 11 is provided with one or more adjusting nuts 15, through the medium of which the degree of expansion applied to the arms by the spring may be determined and regulated to suit circumstances.

The device is extremely simple; easily applied and particularly effective in accomplishing the desired control of the pattern chain.

Having thus described my invention, what I claim and desire to secure by Letters Patent is:—

In a controlling mechanism for pattern chains on knitting machines, a pair of pivotally joined brake arms, each carrying a friction member, one of which is formed with a tapped opening and the other with a perforation, a threaded stem held between the free ends of the arms and engaging said openings, a spring carried by said stem and adapted to expand the brake arms, and means for regulating the expansive effort of the spring.

In testimony whereof I affix my signature.

FRANK R. RITTER.